(12) United States Patent
Spies et al.

(10) Patent No.: US 7,017,181 B2
(45) Date of Patent: Mar. 21, 2006

(54) IDENTITY-BASED-ENCRYPTION MESSAGING SYSTEM WITH PUBLIC PARAMETER HOST SERVERS

(75) Inventors: Terence Spies, Palo Alto, CA (US); Rishi R. Kacker, Menlo Park, CA (US); Guido Appenzeller, Menlo Park, CA (US); Matthew J. Pauker, Menlo Park, CA (US); Eric Rescorla, Palo Alto, CA (US)

(73) Assignee: Voltage Security, Inc., Palo Alto, CA (US)

( * ) Notice: Subject to any disclaimer, the term of this patent is extended or adjusted under 35 U.S.C. 154(b) by 77 days.

(21) Appl. No.: 10/607,195

(22) Filed: Jun. 25, 2003

(65) Prior Publication Data

US 2005/0010801 A1 Jan. 13, 2005

(51) Int. Cl.
G06F 11/30 (2006.01)
G06F 12/14 (2006.01)
H04L 9/00 (2006.01)
H04L 9/32 (2006.01)

(52) U.S. Cl. .................... 726/3; 713/156; 713/175; 380/277; 380/278; 380/279

(58) Field of Classification Search ............ 713/200, 713/156, 175; 380/21, 49, 277–279; 709/206, 709/225, 238; 726/3
See application file for complete search history.

(56) References Cited

U.S. PATENT DOCUMENTS

| 5,016,276 A | 5/1991 | Matumoto et al. |
| 5,159,632 A | 10/1992 | Crandall |
| 5,271,061 A | 12/1993 | Crandall |
| 5,272,755 A | 12/1993 | Miyaji et al. |
| 5,581,616 A | 12/1996 | Crandall |
| 6,061,448 A * | 5/2000 | Smith et al. ................. 380/282 |
| 6,396,830 B1 * | 5/2002 | Aravamudan et al. ...... 370/356 |
| 2002/0076042 A1 | 6/2002 | Sandhu et al. |
| 2002/0169857 A1 * | 11/2002 | Martija et al. ............... 709/220 |
| 2002/0188690 A1 * | 12/2002 | Lee ............................ 709/206 |
| 2003/0081785 A1 * | 5/2003 | Boneh et al. ................ 380/277 |
| 2003/0115448 A1 * | 6/2003 | Bouchard .................... 713/153 |
| 2003/0120733 A1 * | 6/2003 | Forman ....................... 709/206 |
| 2003/0163567 A1 * | 8/2003 | McMorris et al. ........... 709/225 |
| 2003/0179885 A1 * | 9/2003 | Gentry et al. ............... 380/277 |

(Continued)

FOREIGN PATENT DOCUMENTS

WO WO 02/51066 A1 6/2002

OTHER PUBLICATIONS

Mont et al., "The HP Time Vault Service: Innovating the Way Confidential Information is Disclosed, at the Right Time", http://www.hpl.hp.com/techreports/2002/HPL-2002-243.html (2002).*

(Continued)

Primary Examiner—Christopher Revak
Assistant Examiner—Shin-Hon Chen
(74) Attorney, Agent, or Firm—G. Victor Treyz

(57) ABSTRACT

A system is provided that uses identity-based encryption (IBE) to support secure communications. Messages from a sender may be encrypted using an IBE public key and IBE public parameter information associated with a recipient. The recipient may decrypt IBE-encrypted messages from the sender using an IBE private key. A host having a service name may be used to store the IBE public parameter information. The sender may use a service name generation rule to generate the service name based on the IBE public key of the recipient. The sender may use the service name to obtain the IBE public parameter information from the host.

23 Claims, 8 Drawing Sheets

U.S. PATENT DOCUMENTS

2003/0182554 A1* 9/2003 Gentry et al. ............... 713/171
2003/0198348 A1* 10/2003 Mont et al. ................. 380/277

OTHER PUBLICATIONS

U.S. Appl. No. 10/298,991, filed Nov. 14, 2002, Appenzeller et al.

Jeremy Horwits and Ben Lynn, "Toward Hierarchical Identity-Based Encryption," Advances in Cryptology: EUROCRYPT 2002, Lecture Notes in Computer Science, vol. 2332, pp466-481, 2002.

Xuejia Lai and James L. Massey, "A Proposal for a New Block Encryption Standard," Advances in Cryptology—EUROCRYPT '90, pp. 389-404, Proceedings, LNCS 473, Springer-Verlag, 1991.

* cited by examiner

IDENTITY-BASED-ENCRYPTION MESSAGING SYSTEM WITH PUBLIC PARAMETER HOST SERVERS

BACKGROUND OF THE INVENTION

This invention relates to messaging systems such as email messaging systems, and more particularly, to messaging systems that use identity-based encryption.

Cryptographic systems are used to provide secure communications services such as secure email services and secure web browsing.

With symmetric key cryptographic systems, the sender of a message uses the same key to encrypt the message that the recipient of the message uses to decrypt the message. Symmetric-key systems require that each sender and recipient exchange a shared key in a secure manner.

With public-key cryptographic systems, two types of keys are used—public keys and private keys. Senders may encrypt messages using the public keys of the recipients. Each recipient has a private key that is used to decrypt the messages for that recipient.

One public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems such as the RSA system that use this type of traditional approach are referred to herein as PKE cryptographic systems.

Identity-based-encryption (IBE) systems have also been proposed. With IBE encryption systems, a message recipient's email address or other identity-based information may be used as the recipient's public key. With IBE encryption schemes, it is generally not necessary to look up a given recipient's public key as with PKE systems such as the RSA system. Rather, a sender in an IBE system may generate the given recipient's IBE public key based on known rules. For example, a sender may create the IBE public key of a recipient by simply determining the recipient's email address. Recipients of IBE-encrypted messages may use their IBE private keys to decrypt the messages.

Although a sender of a message in an IBE system generally need not look up a recipient's public key before sending an encrypted message to a recipient, the sender must obtain certain "public parameter information" that is associated with the recipient prior to encrypting the message.

Each recipient generally has their own IBE private key, but the IBE public parameter information associated with a given recipient is generally shared with many other recipients. Although the IBE public parameter information associated with a recipient may be provided to the sender of a message by the recipient if needed, requiring recipients to provide the appropriate IBE public parameter information to senders before any IBE-encrypted messages are sent would tend to obviate many of the advantages provided by IBE schemes.

Improved techniques for making IBE public parameter information available to IBE system users are therefore desired.

SUMMARY OF THE INVENTION

In accordance with the present invention, an identity-based-encryption (IBE) system is provided in which senders may encrypt messages for recipients using identity-based encryption. Each recipient has an IBE public key, an IBE private key, and associated IBE public parameter information. A recipient can use their IBE private key to decrypt an IBE-encrypted message.

A sender may encrypt a message for a recipient using the IBE public key of the recipient and the IBE public parameter information associated with the recipient.

The sender may generate the IBE public key of an intended recipient using known rules. For example, the IBE public key of the recipient may be based on the recipient's email address or other identity information. The sender may retrieve the IBE public parameter information from an appropriate host.

In the system, there may be many different private key generators for generating IBE private keys and IBE public parameter information for the recipients. There may be a different host associated with each private key generator for hosting the IBE public parameter information from that private key generator.

A sender who desires to send an encrypted message to a given recipient may use the recipient's IBE public key to determine which IBE public parameter host should be contacted to obtain the appropriate IBE public parameter information for that given recipient. Each host may have a service name such as a domain name or email address. The sender may use a service name generation rule and the IBE public key of the recipient to generate the service name of the host that is hosting the recipient's associated IBE public parameter information.

After the service name has been created, the sender may use the service name to obtain the IBE public parameter information from the appropriate host. With one illustrative service name generation rule, the sender may prepend a known string to a portion of the recipient's email address. The sender may then use the service name that has been constructed to contact the host and obtain the IBE public parameter information.

Once the sender has obtained the IBE public parameter information from the host, the sender may use this information in encrypting the message for the recipient.

To ensure the integrity of the IBE system, senders must be able to trust the IBE public parameters they receive from the IBE public parameter hosts. The IBE public parameter information is therefore preferably delivered from the host servers to the senders in a secure fashion.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
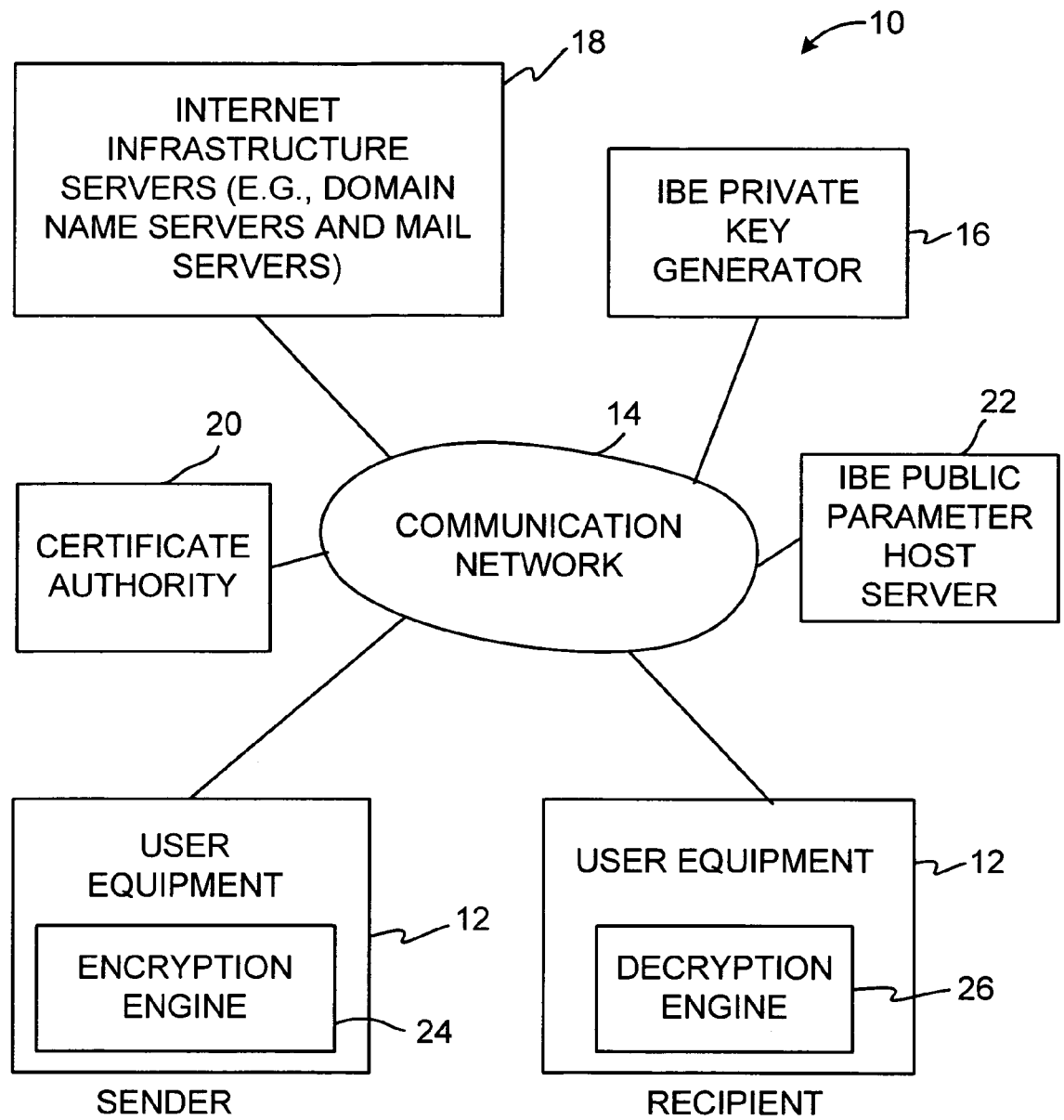
FIG. 1 is a diagram of an illustrative identity-based encryption system in accordance with the present invention.

An illustrative system 10 that may be used to support secure messaging is shown in FIG. 1. A user may send a secure message to one or more other users over a communications network 14. The users in the systems described herein may be individuals, organizations, parts of organizations, or any other suitable parties or entities. Users who are sending messages are called senders. Users receiving messages are called recipients. The messages may include any digital information (e.g., text, graphics, audio, video, commands, executable code, data, etc.) that it is desired to convey electronically between senders and recipients in a secure manner.

Users may communicate with each other using user equipment devices 12. Equipment 12 may, for example, include computing equipment such as a personal computers, portable computers, mainframe computers, networked computers or terminals, telecommunications equipment, handheld computers or personal digital assistants, or cellular telephones. Multiple individuals or organizations may use the same device. For example, a group of workers in an office may share the use of a single computer terminal that is connected to a host computer in a local area network. In some environments, the senders and recipients may use router equipment or other such network equipment to send and receive messages related to network set-up and maintenance. These are merely illustrative examples of the type of platforms that system 10 may use. User equipment 12 may be based on any suitable electronic equipment if desired.

The equipment of FIG. 1 may be interconnected by communications paths in a communications network 14. Network 14 may be, for example, the Internet, a local area network, a wide area network, the public switched telephone network, a virtual private network, a wired network, a wireless network, a network including dedicated leased lines, a network based on fiber-optic or cable paths or other wired or wireless paths, or a network formed using any other suitable network technology or a combination of such networks.

Various computing devices may be used with network 14 to support secure messaging features. The location of such computing equipment (i.e., whether the computing equipment is considered to be within or part of network 14 or is considered to be connected to network 14 from another location) is generally not critical. For example, computing equipment may be used to implement the functions of a server or other computer equipment at an IBE private key generator 16, Internet infrastructure equipment or servers 18 such as domain name servers and mail servers, a server at a certificate authority 20, and a server or other host 22 that is used to store IBE public parameter information, etc. These servers may be co-located with a sender, may be connected to the network 14 as an independent third party service, may be part of the infrastructure of network 14, may be associated with a given recipient's organization, may be co-located with the recipient, or may used at more than one of these locations. These are merely illustrative arrangements and need not be mutually exclusive.

A server may be formed using a single computer or multiple computers. Multiple servers may be implemented on one computer. If desired, the functions of a single server may be provided by computers that are distributed over a number of different physical locations. The functions implemented using servers in system 10 may generally be performed using other computer equipment configurations if desired, but the computing equipment for implementing these functions is generally referred to as a "server" or "servers" for clarity.

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or other electronic messages (e.g., messages sent between network equipment such as ICMP messages or messages sent between corporate IT systems, etc.) may be sent. Email messages may be used in contexts in which the widespread acceptance of the standard email format is important. Instant messages are generally limited in size, but may be delivered with less delay (e.g., less than a second) than email messages (which are typically delivered in less than one minute). For clarity, the present invention is sometimes described in the context of email messages. This is merely illustrative. Any suitable type of messages may be conveyed between senders and receivers if desired.

Some user activities in system 10, such as sending person-to-person email messages, involve at least some manual intervention. For example, a person who desires to send a personally-composed text message must type the message before it is encrypted and sent to the appropriate recipient. However, other user activities in system 10 may be entirely automated so that no human intervention is generally required. As one example, the user at one device 12 may be a banking institution that desires to use encrypted communications to deliver encrypted bank statements to account holders at other devices 12 over communications network 14. The statement preparation and distribution processes may be automated so that no operator intervention is generally needed at the banking institution's equipment once the system has been properly set up. User receipt of the statements may also be automated. As another example, user devices 12 may be routers or other network equipment devices that autonomously exchange messages related to network setup and maintenance operations. In this scenario, each router (or the part of the network entity associated with each router) may be considered to be a "user" in the system. Moreover, system functions involved in presenting on-screen options for humans to respond to (e.g., by clicking on them using a computer mouse) are also automated in that they are implemented using software running on the components of the system. Whether a particular function preferably involves manual intervention or may be implemented by a computer will be clear from context in the following discussion.

During certain operations of system 10, various entities (e.g., a private key generator, a certificate authority, etc.) may need to verify that a given party has permission to access certain content or to perform certain functions. In general, the entity performing an authentication may use any suitable manual or automatic authentication technique. For example, a party may be asked to fax or mail a letter to the authenticating entity on the user's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. A user may provide credentials in the form of a pre-established user name and password. Certificate authority 20 may create digital certificates that help to verify the identities of certain parties. Digital signatures (e.g., signatures from a certificate authority or other entity that use PKE private keys and that can be verified using matching PKE public keys) may be used to ensure that a message or other signed data is associated with a particular party.

Sometimes authentication information and other information (in addition to the messages being sent from the senders to the recipients in system 10) must be conveyed between parties securely. A number of different approaches may be used to convey information over network 14 securely. For example, information may be conveyed securely over a secure communications path such as a communications path that uses the secure sockets layer protocol (SSL), the transport layer security (TLS) protocol, or other suitable secure protocol, a communications path may be trusted because it is under the control of a trusted party (e.g., the communications path may be physically under the control of a trusted party), and information may be conveyed securely by encrypting the information (e.g., in a message) before sending it over an insecure (or secure) link.

The operation of system 10 may involve the use of traditional public-key encryption cryptographic techniques such as used with RSA public-key cryptography. For example, the secure sockets layer protocol, which may be used to secure communications between parties when a web browser or other applications are used, involves the use of certificates from trusted certificate authorities such as certificate authority 20. These traditional public key cryptographic techniques are referred to herein as "PKE" cryptographic techniques.

The operation of system 10 may also use identity-based encryption (IBE) cryptographic techniques. These cryptographic techniques are referred to herein as "IBE" cryptographic techniques.

PKE and IBE encryption schemes use an asymmetric approach. Some information (so-called public key information) is used to encrypt messages. Other corresponding information (so-called private key information) is used to decrypt the encrypted message.

To enhance the efficiency of the decryption and encryption processes, two-step decryption techniques may be used in which a message key (e.g., a symmetric message key) is used to encrypt the contents of a message prior to transmission to the recipient. The PKE or IBE process is then used to encrypt the symmetric message key. The message that is sent from the sender to the recipient contains the PKE-encrypted or IBE-encrypted message key and the message-key-encrypted message contents. At the recipient, the recipient uses the PKE private key or IBE private key to decrypt the message key. The message key may then be used by the recipient to decrypt the rest of the message. These two-step processes may be more efficient than "pure" or "single step" PKE and IBE encryption algorithms in which the PKE algorithm or IBE algorithm alone is used to encrypt the entire message. In general, either "two-step" encryption schemes or "single-step" schemes may be used. Both types of approaches are referred to herein as simply "PKE" schemes or "IBE" schemes for clarity.

IBE encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231–229. August 2001. See also http://eprint.iacr.org/2001/090 by Dan Boneh and Matthew Franklin). With the approach described in the work of Boneh and Franklin, IBE encryption is based on the properties of bilinear maps such as a Weil Pairing or Tate Paring. For clarity, aspects of the present invention will sometimes be described in the context of an identity-based encryption scheme such as the elliptic curve implementation described by Boneh and Franklin. This is, however, merely illustrative. Any suitable approach for IBE encryption may be used with system 10 if desired.

Initially, when the system is set up, an IBE private key generator (e.g., IBE private key generator 16 of FIG. 1) obtains or generates a master secret s. For example, the private key generator may create a master secret from a number that is randomly generated at the private key generator by a processor housed inside a tamper-proof enclosure. The master secret may also be produced off-site and delivered to the private key generator 16. The master secret (also sometimes referred to as a secret master key or a master key) is secret information that will subsequently be used by the private key generator 16 to generate private keys for recipients in the system to use in decrypting messages and to generate public parameter information for use by senders in encrypting messages.

After the master secret s has been obtained, the private key generator may generate the public parameter information. In the identity-based encryption approach of the above-mentioned work of Boneh et al., the public parameter information that is generated includes public parameters P and sP. The parameter P may first be generated by the IBE private key generator (e.g., using a random number generator). The parameter sP may then be generated by the IBE private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is so computationally expensive that it is impractical to obtain s in this way.

The public parameter information (e.g., the parameters P and sP in an identity-based encryption process based on elliptic curves) may be numbers. In general, there is an equivalency between numbers, letters, symbols, and other such schemes for representing information. Sometimes certain information (e.g., the master secret or public parameters) will be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., P and sP) has been determined, the IBE private key generator 16 may provide this information to an IBE public parameter host service implemented using a server such as IBE public parameter information host server 22 of FIG. 1. The host 22 and the private key generator 16 may be co-located or the host 22 and private key generator may be at different locations. The IBE private key generator 32 may provide the IBE public parameter information to the host 22 by physical delivery (e.g., on a diskette), by electronic delivery (e.g., secure delivery using a secure communications path or an encrypted message), or using other suitable techniques.

After the IBE public parameter information has been provided to IBE public parameter host server 22, the host 22 may make this information available to users in system 10. The IBE public parameter host service may be identified by a service name. Users in the system 10 can access the IBE public parameter information using the service name.

If the public parameter information includes more than one parameter, the parameters may be obtained by users together or separately. For example, parameters P and sP may be provided to the user by the IBE public parameter host service on server 22 together in a single transmission or separately in two transmissions. If parameters P and sP are provided separately, each parameter may be distributed using a different distribution mechanism. For example, P may be provided to a user over a secure sockets layer path and sP may be conveyed to the user in an encrypted email message. As another example, all users may know P in advance and sP may be distributed electronically. If desired, P may be the same for all or substantially all users in the system. Moreover, P and sP may be combined to form the equivalent of a single number or parameter or may be subdivided (e.g., to form three or more public parameter sub-parts). If desired, some of the public parameter information may be distributed manually (e.g., by printed mail or by distributing a diskette or other computer-readable media to the user).

Once the public parameter information (e.g., public parameters P and sP) has been provided to a user (i.e., a sender) who desires to send an encrypted message to another user (i.e., a recipient), the sender may encrypt and send the message to the recipient. An IBE encryption engine 24 implemented on the sender's equipment may be used to encrypt the message. The IBE encryption engine 24 may use the public parameter information (e.g., P and sP) and the IBE public key associated with the recipient to perform message encryption. When the recipient receives the IBE-encrypted message, or earlier, when the recipient sets up or updates the equipment at the recipient's location, the recipient obtains the recipient's IBE private key from the IBE private key generator to use in decrypting the message. The recipient may use an IBE decryption engine 26 implemented on the recipient's equipment to decrypt the message. The IBE encryption engine 24 and decryption engine 26 may use software to implement the desired IBE encryption and decryption algorithms. Engines 24 and 26 may be provided to users in the system as part of the users' initially-loaded messaging software, as a downloadable program or plug-in, or using any other suitable technique.

Identity-based encryption (IBE) is so named because the encryption process at the sender uses an IBE public key Q that is generally based on the recipient's identity. The identity of a user in an IBE encryption scheme may be represented by any suitable string, number, or symbol. For example, the identity of a message recipient may be represented by that recipient's email address, name, or social security number. An advantage of IBE schemes is that a sender can generally determine the identity (e.g., the email address) of an intended recipient without all of the complexities involved in obtaining the PKE-public key of the intended recipient as would be required with traditional PKE schemes such as the RSA cryptographic scheme. For example, the IBE public keys may be the same as (or based on) user email addresses, which are readily obtainable.

The IBE private key generator 16 may generate IBE private keys for each of the multiple users associated with that IBE private key generator based on the IBE public keys (the Q's) of each of these users (e.g., based on the users' identities).

The form of IBE public key Q that is used for a given IBE system depends on the security features that are desired. For example, user privileges may be made to automatically expire by automatically concatenating a validity period (e.g., a date or date range such as the current day of the year and year, the current month, starting and ending dates such as Jan. 2, 2003–Jan. 10, 2003, or any other suitable time-related date-stamp information) with each user's email address to form Q values based not only on the users' identities (i.e., email addresses) but also validity period information.

As another example, users' privileges may be restricted based on security clearance level, by concatenating or otherwise adding security clearance level information to each user's email address when forming the public keys Q (i.e., Q=joe@navy.com|top_secret, etc.). These approaches are merely illustrative of the ways in which additional criteria may be added to a user identity such as a user email address when forming the IBE public key for each user (e.g., the Q for each user). Any suitable approach for forming IBE public keys based on user identity information and policy criteria may be used if desired.

Moreover, the IBE public keys used in system 10 may, if desired, be based solely on policy information without being based on a specific individual's identity. As an example, an IBE public key may be based solely on an availability date (e.g., Mar. 20, 2003). A message encrypted using this IBE public key may not be accessed by anyone until after Mar. 20, 2003. With this type of scheme, an IBE-encrypted message may be distributed to numerous individuals in parallel. Only those individuals who are authorized (i.e., those who have or can obtain the appropriate IBE-private key) may decrypt the message and access its content.

A sender may send an IBE-encrypted message to multiple recipients. For example, a sender may send a message to a list of distinct email addresses, each associated with a different recipient each of which has a different IBE private key. In this type of scenario, the sender encrypts the message sent to each recipient differently (i.e., using the appropriate IBE public key for each intended recipient).

When a sender uses a policy-based IBE public key Q to encrypt a message, the same version of the encrypted message may be sent to multiple parties in parallel. In this case, a "recipient" in the system 10 may be made up of multiple individuals or organizations. Anyone who can decrypt the message properly can view the message contents. Examples of multiple-party recipients to whom a sender may send an IBE-encrypted message include all members of a particular organization, all individuals or organizations with a particular security clearance, all supply chain management systems associated with the supplier's of a particular company, all subscribers to a particular service, etc.

A sender desiring to send an IBE-encrypted message should have information sufficient to construct the IBE public key Q. This information may include information on an individual's identity (e.g., an email address), information on how to construct the IBE public key Q from policy information (e.g., validity period, security level, subscription level, etc.), or any other suitable identity and/or policy information.

The sender must also obtain the public parameter information (e.g., P and sP) from the IBE public parameter information hosting service at server 22. Prior to message transmission, the sender may use the IBE encryption process (e.g., the process of the work of Boneh and Franklin described above) to encrypt the message contents for the recipient. The IBE process may be implemented using software at the sender's equipment (e.g., IBE encryption engine 24). The IBE encryption engine may take as inputs (1) the message to be encrypted, (2) the IBE public parameter information (e.g., P and sP), and (3) the IBE public key Q. The IBE process implemented using the IBE encryption engine 24 produces an encrypted version of the message as its output.

The sender may transmit the encrypted message to the recipient using an email program or other suitable messaging software. After the sender transmits the IBE-encrypted message to the recipient over communications network 14, the recipient may receive and decrypt the received message using an appropriate IBE private key. The recipient may use decryption engine 26 to decrypt the message. The IBE private key that is used for decrypting the message is related to the identity-based-encryption public key Q and public parameter information (e.g., P and sP) used when encrypting the message. Only the IBE private key that matches the IBE public key that was used to encrypt the message may be used to decrypt the message. Generation of the IBE private key requires knowledge of the master secret s, so only the private key generator 16 can generate the recipient's IBE private key based on the recipient's IBE public key Q.

With one suitable approach, the IBE private key for the recipient may be generated from the recipient's IBE public key Q and the master secret s by using an appropriate mathematical function (e.g., the multiplication of integers with points on elliptic curves) to calculate the value of sQ. The recipient's authorization to receive the message may be verified using authentication information (credentials) from the recipient before the IBE private key is issued to the recipient by the IBE private key generator 16. Any suitable manual or automatic authentication technique may be used by the IBE private key generator 16 to verify that the recipient is authorized to receive the IBE private key prior to issuing the key to the recipient.

Regardless of how the IBE private key generator 16 determines that the recipient is authorized to obtain the IBE private key, the private key should be provided to the recipient for use in decrypting the message. Any suitable technique may be used to provide the IBE private key to the recipient. For example, the private key may be transmitted to the recipient in an email or other suitable message or may be made available for downloading over the Internet (as part of a stand-alone downloadable application or a downloadable plug-in module, as a stand-alone key, etc.). A secure communications channel may be used for electronic communications between the IBE private key generator 16 and the recipient's equipment 12. If desired, the IBE private key may be preinstalled on the recipient's equipment, so that the private key will be available for the recipient when the recipient first uses the equipment. The private key may also be distributed by mail or courier (e.g., on a computer-readable medium such as a computer disk or memory chip).

The recipient may, if desired, store the private key locally (e.g., in a database on a storage device such as a memory circuit or hard drive on the recipient's equipment). If the private key is stored locally, the recipient can retrieve it the next time a message needs to be decrypted without needing to contact the IBE private key generator 16 to obtain a new copy of the IBE private key over the communications network.

Figure 2:
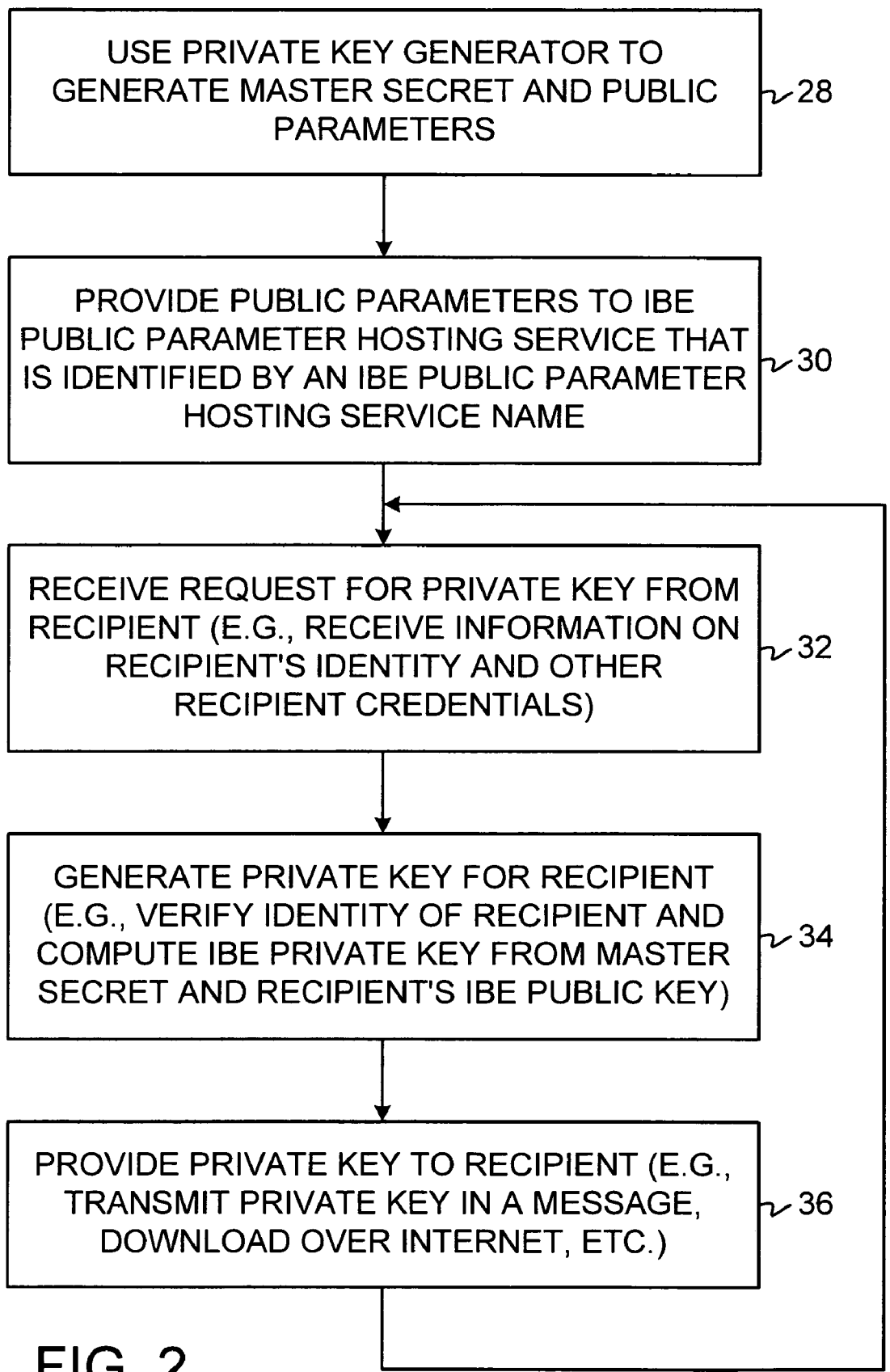
FIG. 2 is a flow chart of illustrative steps involved in using a private key generator in accordance with the present invention.

Steps involved in using private key generator 16 to support IBE messaging in the system of FIG. 1 are shown in FIG. 2. At step 28, private key generator 16 of FIG. 1 obtains a master secret s. For example, the private key generator may create a master secret from a number that is randomly generated at the private key generator by a processor housed inside a tamper-proof enclosure. The master secret may also be produced off-site and delivered to the private key generator 16. The master secret (also sometimes referred to as a secret master key or a master key) is secret information that will subsequently be used by the private key generator 16 to generate private keys for recipients in the system to use in decrypting messages and to generate public parameter information for use by senders in encrypting messages.

During step 28, the private key generator may generate the public parameter information. For example, the private key generator 16 may obtain or generate a public parameter P. Using a mathematical function appropriate for the specific type of identity-based encryption being used, and using the values of the master secret s and public parameter P as inputs, the private key generator may also generate a corresponding public parameter sP.

At step 30, the private key generator 16 may provide the public parameter information (e.g., public parameters P and sP) to an IBE public parameter hosting service such as an IBE public parameter hosting service implemented on IBE public parameter host server 22 of FIG. 1. The private key generator 16 may, for example, transmit the IBE public parameter information to IBE public parameter host server 22 over a secure link. If desired, the public parameter information may be provided from private key generator 16 to host server 22 by a manual transfer or in a secure message. The hosting service has an associated service name (e.g., a web address, email address, etc.). Later, when the sender desires to access the public parameter information, the service name may be used by the sender to identify and contact the host server 22 through the use of Internet infrastructure servers or equipment 18 (e.g., domain name servers, Internet mail system servers, routers, etc.).

Once the public parameter information (e.g., public parameters P and sP) has been provided to a sender who desires to send an encrypted message to a recipient, the sender may encrypt and send the message to the recipient. When the recipient receives the encrypted message, or earlier, when the recipient sets up or updates the equipment at the recipient's location, the recipient obtains the recipient's IBE private key from the private key generator.

The private key generator may generate private keys for each of the multiple users associated with that private key generator based on the identities of each of these users and/or based on policy information. User identities may be represented by any suitable string, number, or symbol. For example, the identity of a message recipient may be represented by that user's email address, name, or social security number. A user's privileges may be made to automatically expire in system 10 by automatically concatenating the current time (e.g., the current day of the year and year, the current month, or any other suitable time-related date-stamp information) with the user's email address. Other policy information (e.g., credentials such as a security clearance) may also be combined with the user's email address or other identity to provide enhanced cryptographic services or policy information may be used to form the public key alone. The IBE public key Q associated with the recipient and the IBE private key of the recipient may be generated from the identity and/or policy information using a suitable IBE key generation algorithm.

If a private key is requested by the recipient (as opposed, e.g., to being automatically distributed), such a request may be received by the private key generator 16 at step 32 of FIG. 2. The recipient's public key Q (or an appropriate precursor of Q) or other information that identifies the recipient or private key being requested and authentication information (recipient credentials) that may be used to verify that the recipient is authorized to receive the private key may be included in the request that is received by the private key generator 16 at step 32.

At step 34, the private key generator 16 may generate a private key for the recipient. For example, the private key for the recipient may be generated from the recipient's public key Q and the master secret s by using an appropriate IBE mathematical function to calculate the value of sQ. Prior to issuing the private key to the recipient, the recipient's authorization to obtain the private key may be verified at step 34 using recipient credential information (e.g., username and password information) that is received from the recipient.

After the private key generator 16 authenticates the recipient and generates the recipient's private key at step 34, the private key may be provided to the recipient at step 36. For example, the private key may be transmitted to the recipient in an email or other suitable message (e.g., an encrypted message) or may be made available for downloading over the Internet (as part of a stand-alone downloadable application or a downloadable plug-in module, as a stand-alone key, etc.). A secure communications channel may be used for electronic communications between the private key generator 16 and the recipient's equipment 12. If desired, the private key may be preinstalled on the recipient's equipment, so that the private key will be available for the recipient when the recipient first uses the equipment. The private key may also be distributed by mail or courier (e.g., on a computer-readable medium such as a computer disk or memory chip). Batch processing may be used to process lists of recipients in bulk. These are merely illustrative techniques for providing the private key of the recipient to the recipient. Any suitable technique may be used if desired.

After the private key generator provides the private key to the recipient at step 36, control loops back to step 32, so that the private key generator 16 may receive additional requests for private keys from other recipients (or so that the next step in an automated batch processing function may be performed, etc.).

Figure 3:
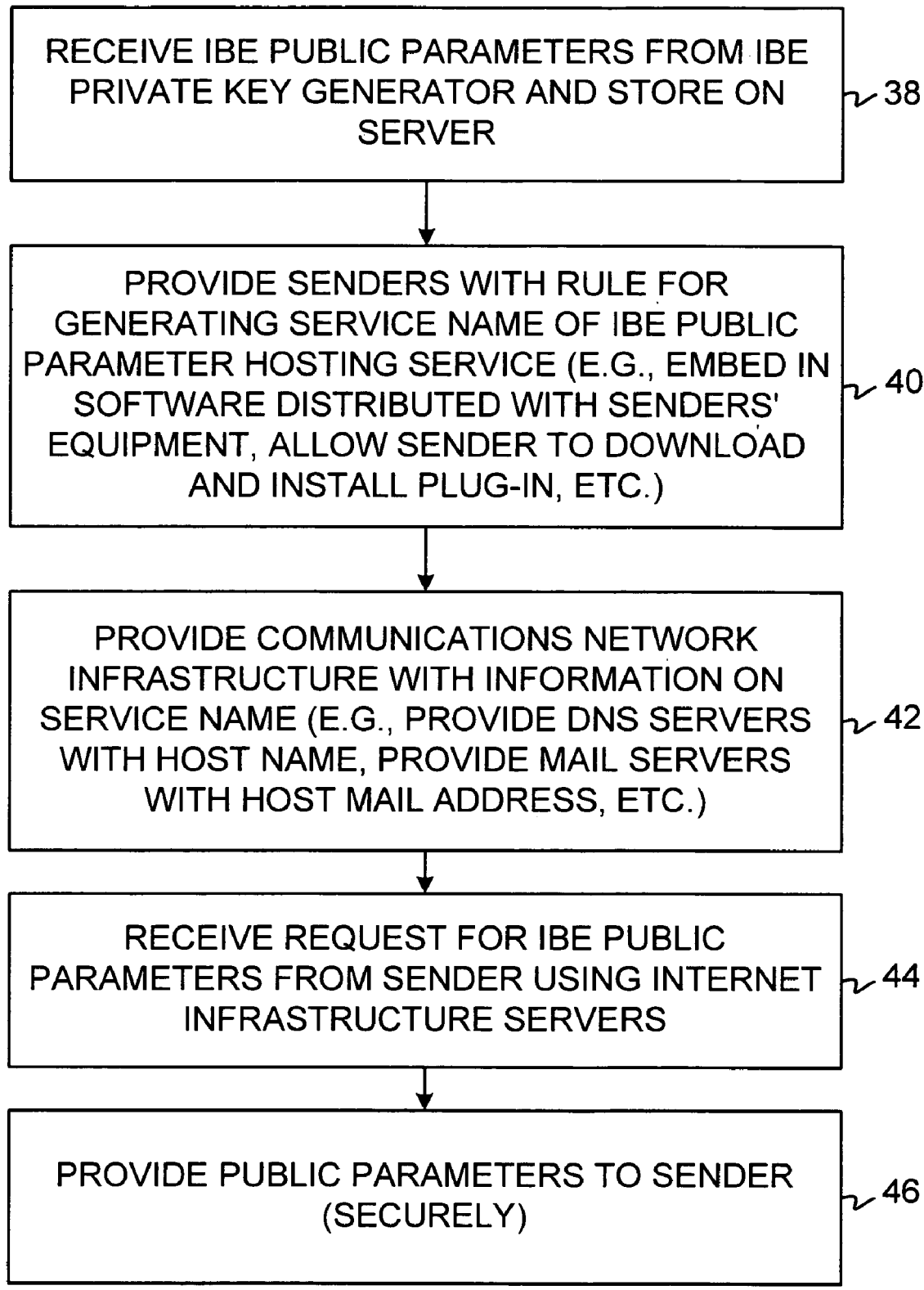
FIG. 3 is a flow chart of illustrative steps involved in using an IBE public parameter host server in accordance with the present invention.

Illustrative steps in operating system 10 from the perspective of the IBE public parameter information hosting service (host server 22) are shown in FIG. 3. At step 38, the host server 22 may receive the IBE public parameter information to be hosted from the IBE private key generator 16. The host server 22 may store the public parameter information locally (e.g., on a hard drive, memory, or other storage device). The IBE public parameter information may be provided from the private key generator 16 to the host server 22 electronically (e.g., over a secure link or in an encrypted message) or may be provided using a manually transported diskette. If the key generator 16 and server 22 are implemented on the same computer, the IBE public parameter information may be conveyed between the private key generator and server 22 using the internal communications paths associated with that computer. These are merely illustrative techniques by which the IBE public parameter information may be conveyed from the IBE private key generator 16 to the host server 22.

The host server may be identified by a service name. For example, a service name of "ibepublicparameters.corporationname.com" (a domain name) or "ibepublicparameters@corporationname.com" (an email address) may be used where "corporationname" is the name of an organization associated with the private key generator 16 and its corresponding host 22.

At step 40, senders may be provided with a service name generating rule for generating the service name. The rule may be used to generate the service name based on the IBE public key Q of the intended recipient of a message (i.e., the service name may be based on Q, may be based on a portion of Q, may be based on a precursor of Q, or may be based on a derivative of Q). The rule may, for example, involve prepending (concatenating to the front) a known string such as "ibepublicparameters." or "ibepublicparameters@" to the domain name portion of a given recipient's email address (e.g., "corporationname.com" when the recipient's email address is "recipient@corporationname.com") to form a domain name or email address that identifies the server. The domain name "corporation.com" may be that of an organization or entity associated with the key generator 16 and host server 22.

In general, there may be many key generators 16, each of which is associated with a different organization (for example) and each of which provides respective IBE public parameter information shared by the associated employees in that organization to a respective host server 22. These various organizations may each use a different domain name for their web and email services (e.g., a domain name based on their corporate name). In this type of environment, it may be particularly desirable to have different service names for different respective hosts 22 that are based on these different domain names. By using a known naming convention (i.e., by prepending the same known string to each domain name), senders can locate each host and obtain its IBE public parameters.

The service name generation rule can be used to generate the service name of the IBE public parameter information host based on the IBE public key Q of the recipient (i.e., based on Q, based on part of Q, based on a precursor to Q, or based on a derivative of Q). Generating the service name for host 22 based on the domain name portion of a recipient's email address is an illustrative example of a suitable service name generation rule that generates the service name based on the IBE public key Q of the intended message recipient in this way (because the recipient's public key is based on the recipient's email address in this example).

The rule for generating the service name may be provided to senders using any suitable technique. For example, the service name generation rule may be embedded in software that is distributed with the senders' equipment, may be downloaded by the sender from a computer on the network 14, may be provided in a plug-in module, may be distributed to senders on a disk or published on a website or in the print media, may be provided to senders in a message format, etc.

The infrastructure of communications network 14 (e.g., Internet infrastructure servers 18) may be informed of the service name. For example, domain name servers 18 may be provided with information that identifies server 22 by its domain name or the servers 18 of the Internet mail system may be provided with information on the email address of server 22. The service name information that is provided to the Internet infrastructure servers 18 may be stored by the Internet servers 18 and later used to allow senders in system 10 to contact and communicate with the server 22 to obtain IBE public parameter information.

Domain name servers 18 may be used by people who are browsing the Internet using web browsers. When a person types in a desired web address into the location field of their browser, the browser contacts an appropriate domain name server. At least initially, this is typically a domain name server associated with that person's Internet service provider (ISP). In response to this query, the domain name server provides the web browser with an Internet Protocol (IP) address corresponding to the desired web address. The browser may then use this IP address to retrieve the desired web content over the Internet (i.e., network 14).

At step 42, the domain name servers 18 or mail system servers 18 or other suitable network equipment may be provided with information that maps the service name of the host server 22 (e.g., "ibepublicparameters.corporationname.com" or "ibeepublicparameters@corporationname.com") to the corresponding network location of host 22 (e.g., to the corresponding IP address of host 22). This set-up information may later be used by these Internet infrastructure servers 18 to direct a sender to the appropriate IBE public parameter host server 22.

A sender who desires to send an IBE-encrypted message to a recipient uses the service name and network equipment such as Internet infrastructure servers 18 to provide a request to the IBE public parameter host 22. At step 44, the host 22 receives the request for the IBE public parameter information from the sender. During step 44, the sender who is obtaining the public parameter information associated with the intended message recipient may, for example, use the domain name servers 18 to translate the service name of server 22 (constructed by the sender from the known rule) to the actual IP address that has been assigned to the server 22 or may use the service name (email address) of sever 22 to communicate with server 22 through the Internet's mail servers.

After network equipment such as the Internet mail system 18 or domain name servers 18 have been used by the sender to request the IBE public parameter information from the server 22 that is associated with the service name, the IBE public parameter host server 22 may respond to the request by providing the sender with the IBE public parameter information at step 46.

Figure 4:
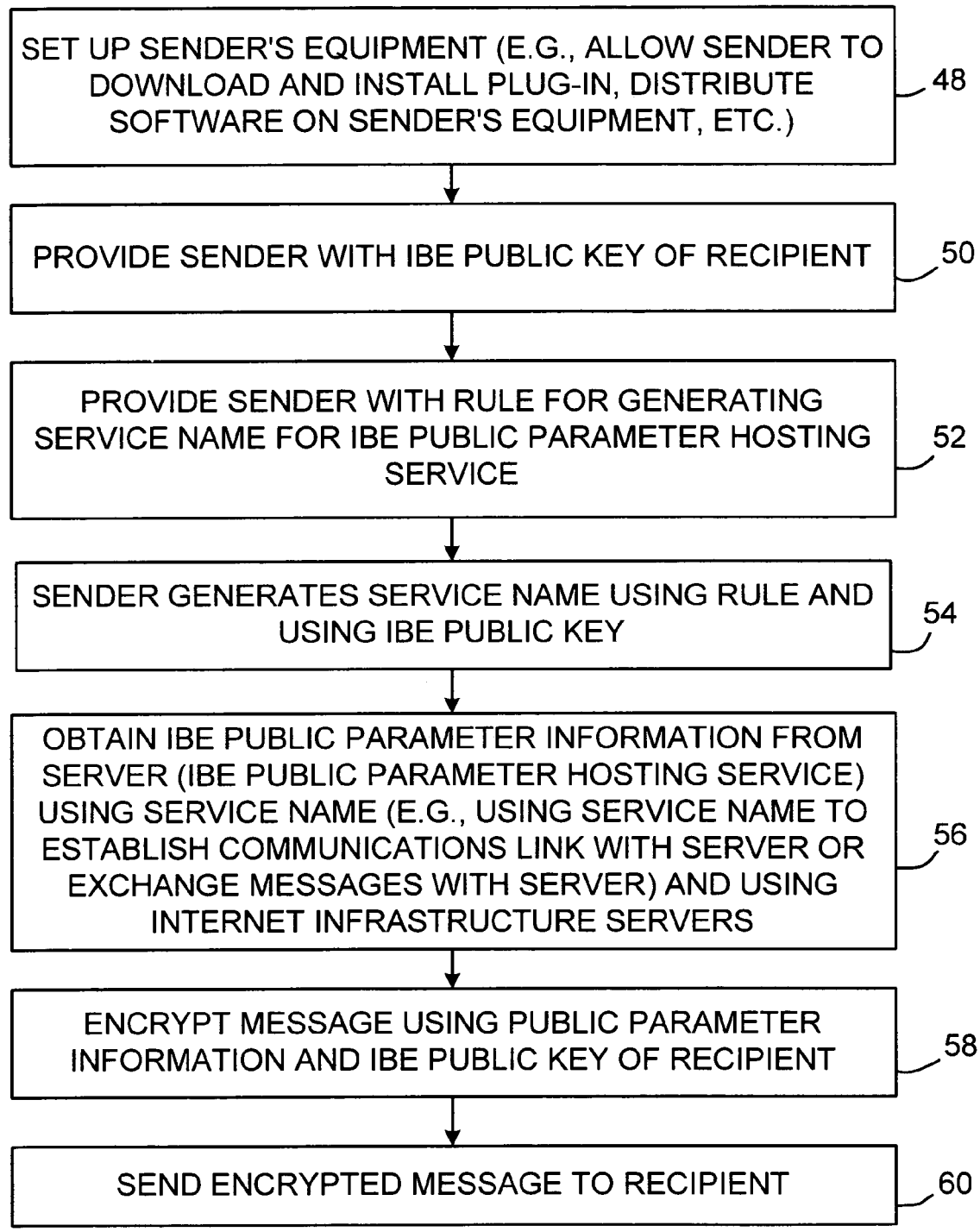
FIG. 4 is a flow chart of illustrative steps involved in allowing a sender to encrypt a message for a recipient in accordance with the present invention.

Steps involved in setting up and using the equipment of a sender to send encrypted messages to a recipient are shown in FIG. 4. At step 48, a sender's equipment 12 may be set up (e.g., appropriate stand-alone or plug-in software may be downloaded onto equipment 12 over network 14 or previously installed software may be activated or run).

At step 50, the sender may be provided with information on the IBE public key of the recipient (Q). For example, the sender may obtain Q or may obtain related precursor information such as the recipient's email address (e.g., electronically in a message or by browsing a web site or directory, over the phone, from a written document, etc.). If desired, the sender's equipment may use an appropriate mathematical function to convert the string information in the recipient's email address into an appropriate value of Q. The IBE public key of the recipient may, if desired, be generated by the sender using known rules (e.g., when the IBE public key is based solely on policy information).

At step 52, the sender is provided with an IBE public parameter information host server service name generation rule. The service name generation rule may be provided electronically (e.g., by providing the rule to the sender in a message or as part of software being installed on the sender's equipment over network 14) or may be provided using a disk or other medium. The service name generation rule may be built into the senders email application, operating system, or other software on the sender's equipment. The private key generator 16 or other suitable entity may provide the rule. The steps of FIG. 4 and the other FIGS. need not be performed in the order shown. Steps may be combined or performed in different orders if desired. As an example, the service name generation rule may be provided to the sender when the sender's equipment is being set up (e.g., step 52 and step 48 may be performed as part of the same set-up process).

The service name generation rule may construct the service name from the recipient's IBE public key Q (i.e., the service name generation rule may construct the service name based on Q, based on part of Q, based on a precursor of Q, or based on a derivative of Q). An illustrative service name generation rule is to prepend a special predetermined string (e.g., "ibepublicparameters.") to the domain name portion of a given recipient's email address (e.g., to concatenate "ibepublicparameters." to "corporationname.com" when the recipient's email address is "recipientname@corporationname.com." The resulting service name generated using this rule would be "ibepublicparameters.corporationname.com". This type of arrangement may be appropriate when an organization that is operating a private key generator 16 has members that receive email using the organization's domain name (i.e., "corporationname.com") and whose corresponding IBE public keys are based on their email addresses. The special string (i.e., "ibepublicparameters") may be widely known or distributed (e.g., to nearly all users in system 10), whereas each domain name (i.e., "corporationname") pertains particularly to a given organization and its members. This allows senders to locate hosts 22 that are associated with many different organizations using the same service name generation rule.

At step 54, the sender may use the known service name generation rule and the IBE public key of the recipient Q to generate the service name for IBE public parameter information host server 22. For example, the sender may prepend a special string to the domain name portion of a recipient's email address or may otherwise modify the recipient's public key Q until the service name is created. A service name generation rule that produces the service name from Q, from a part of Q, from a precursor of Q, or from a derivative of Q is considered to "use Q" in generating the service name and is considered to generate the service name "based on Q." Because each IBE public key Q has corresponding IBE public parameter information (e.g., P and sP), use of a given Q to generate the service name allows the sender to locate a suitable IBE public parameter host for the recipient associated with that Q.

At step 56, the sender may use the service name to communicate with the server 22 and to obtain the IBE public parameter information that the sender needs to encrypt the message for the recipient. When the service name is a domain name, the sender may use domain name servers 18 to translate the host's name into an IP address to contact host servers 22. When the service name is an email address, the sender may use mail servers 18 to contact host server 22. When the sender contacts the server 22, the sender can request that the IBE public parameter information be provided by the server 22 to the sender.

To defeat possible man-in-the-middle or spoofing attacks, the IBE public parameter information that is provided by the server 22 may be conveyed from the server 22 to the sender's equipment 12 using a secure communications technique. For example, the IBE public parameter information may be provided to the sender by the server 22 over a secure communications channel or may be provided by the server 22 to the sender in the form of an encrypted message delivered over a potentially insecure path.

At step 58, the sender may use the IBE public parameter information that has been received from the server 22 and the IBE public key of the recipient as an input into the IBE encryption engine 24. During step 58, the sender's equipment may be used by the sender to compose or create a message and to encrypt that message for transmission to the recipient over network 14. The sender's equipment 12 may, for example, be used to run an email program or other suitable software in which the identity-based encryption algorithm (engine 24) has been incorporated (or added using a plug-in). As another example, identity-based encryption functions may be provided using the operating system of the user equipment device. Messages to be transmitted may also be encrypted using a stand-alone encryption algorithm. Other suitable arrangements may be used if desired. Regardless of the technique that is used for encrypting the message, the message is preferably encrypted using an IBE scheme.

At step 60, the encrypted message may be sent to the recipient by the sender (e.g., using the sender's email application). The value of rP may be included in the email message or may be sent to the recipient separately. The message may be carried over the communications network 14 and may be received by the user equipment 12 of the recipient (e.g., using the recipient's email application).

Figure 5:
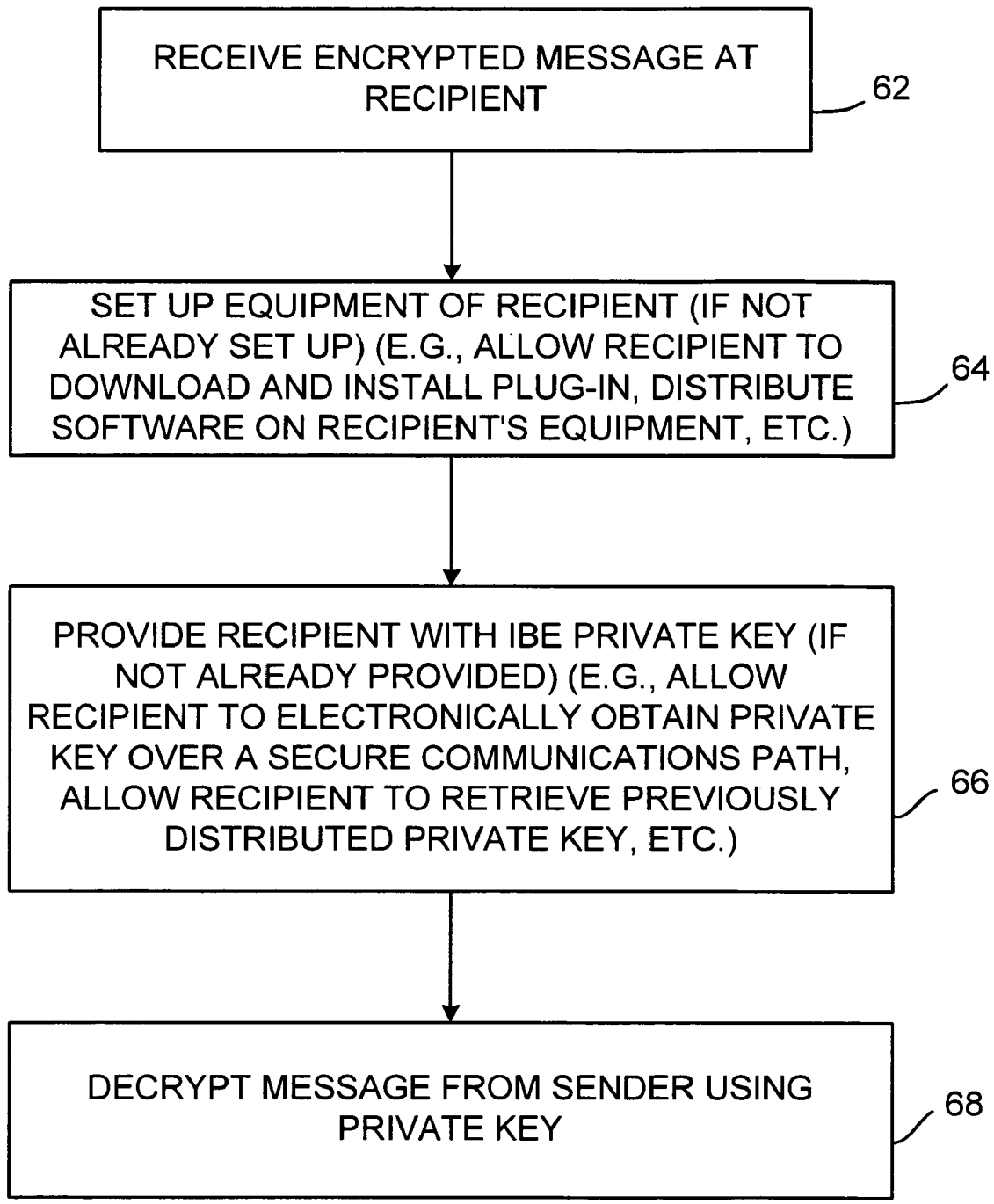
FIG. 5 is a flow chart of illustrative steps involved in allowing a recipient to decrypt a message from a sender in accordance with the present invention.

Illustrative steps involved in setting up and using the equipment of the recipient to receive and decrypt the message of the sender are shown in FIG. 5. At step 62, the recipient's email application or other software running on the recipient's equipment 12 may be used to receive the encrypted message from the sender.

The recipient's equipment may be set up to perform IBE decryption operations during system set up, when a message is received, or at any other suitable time. For example, IBE decryption engine software may be preinstalled on the recipient's equipment and distributed to the recipient when the recipient obtains the equipment. The recipient may also download and install appropriate stand-alone or plug in software. If the recipient's equipment has not already been set up for decryption operations, the equipment may be set up at step 64. For example, appropriate software may be installed from a computer readable medium such as a computer disk or memory chip or may be downloaded from a server over the Internet. Previously installed software may also be activated.

At step 66, the recipient may be provided with the private key sQ (if the recipient has not already been provided with the private key during an earlier operation which can be received from local storage). The private key may, for example, be downloaded or sent to the recipient's equipment from the private key generator 16. The private key may be transmitted over a secure communications channel over network 14.

Any suitable technique may be used to ensure that the communications path between the private key generator and the recipient is secure. For example, the private key generator and recipient may use the secure sockets layer protocol to ensure that communications are secure. The recipient may also physically obtain the key (e.g., via courier or mail on a computer disk). The recipient may request that the private key be provided to the recipient and may receive the private key from the private key generator using secure email communications (e.g., using PKE encryption techniques).

During step 66, the private key generator 16 preferably verifies that the recipient is authorized to receive the private key before the private key for the recipient is released. Any suitable authentication technique may be used. For example, the recipient may communicate with the private key generator over a trusted communications path (e.g., dedicated or trusted lines), the recipient may provide a username and password, the recipient's equipment or a third-party server may present a ticket or other information that proves that the recipient is authorized, the recipient may provide a letterhead or biometric information to the private key generator, etc. This information may be provided electronically (e.g., over a secure path), in person, etc. Once the private key generator 16 verifies the recipient's identity, the private key generator 16 may provide the private key sQ to the recipient at step 68.

After the recipient has received the private key sQ from the private key generator and has received the encrypted message and the randomized public parameter rP from the sender, the recipient may decrypt the message from the sender at step 68. The decryption engine running 26 at the recipient's equipment may use the values of the private key sQ and the parameter rP when decrypting the message.

To ensure the security of the system, the IBE public parameter information that is supplied to the sender by the IBE public parameter host server 22 is preferably provided to the sender in a secure fashion.

Figure 6:
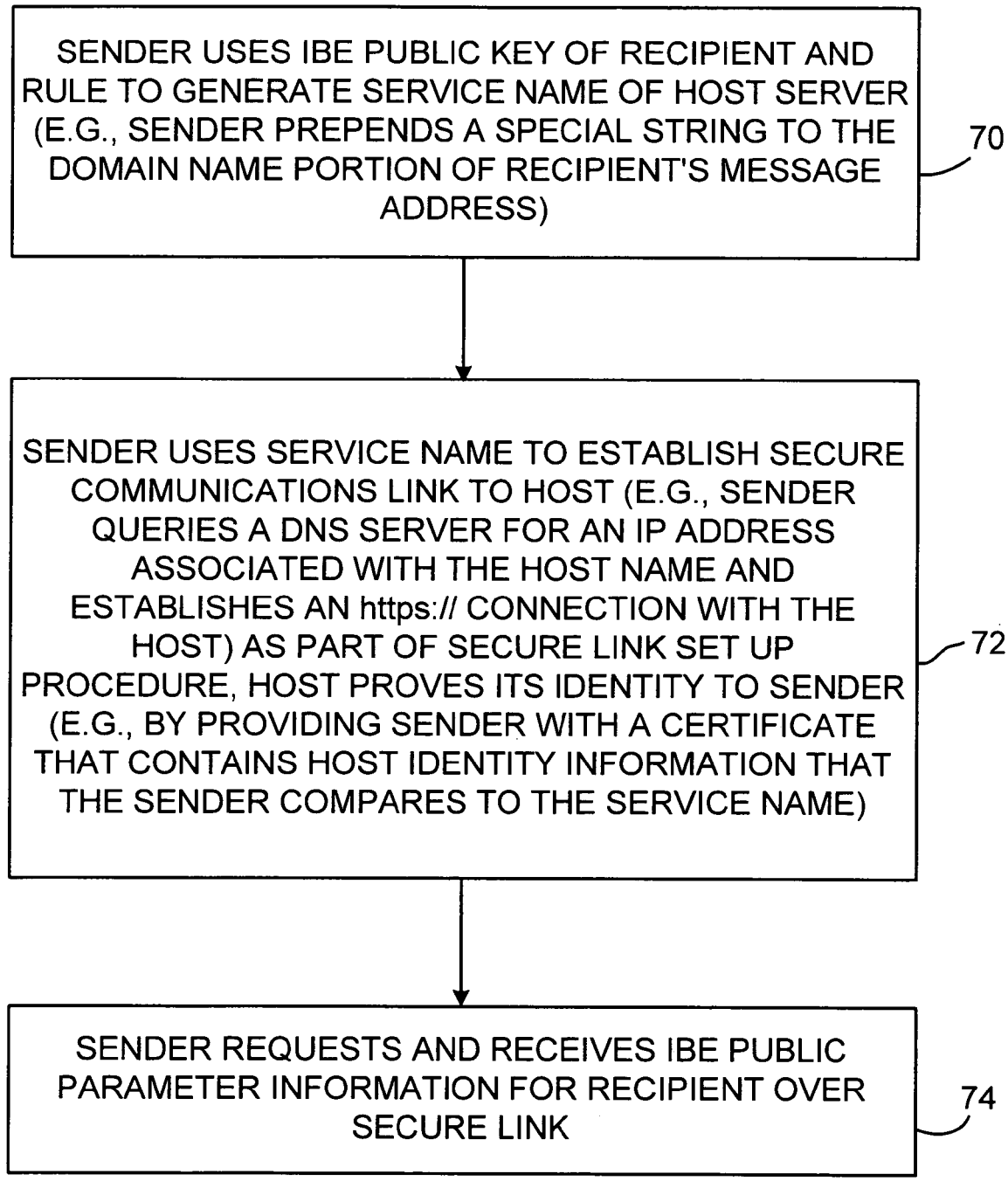
FIG. 6 is a flow chart of illustrative steps involved in using a host server to provide a recipient with IBE public parameter information over a secure link in accordance with the present invention.

Illustrative steps involved in providing the IBE public parameter information to the sender from the server 22 using a secure communications link between the sender and the server 22 are shown in FIG. 6.

At step 70, the sender may use the IBE public key of the recipient and the service name generation rule to generate the service name of the server 22. The rule may be, for example, a rule that directs the sender to prepend a given string to the domain name portion of the recipient's email address.

At step 72, the sender may use the service name to establish a secure communications link with server 22. For example, the sender's email application or other suitable software on the sender's equipment may open an SSL or TLS connection by passing the service name to a domain name server 18 on network 14 (e.g., the Internet). The domain name server 18 includes a database (which may also be referred to as a look-up table or translation table), that associates domain names with IP addresses. Included in the domain name server's database is an entry which maps the service name of server 22 to the IP address of server 22. The domain name server was provided with this information when the server 22 was initially set up (e.g., when the entity associated with private key generator 16 was in the process of establishing server 22 and providing server 22 with the IBE public parameter information).

Once the domain name server 18 receives the service name, the domain name server can determine the IP address of server 22 and the IP address can be used to establish an SSL or TLS link or other secure link between the sender and the server 22. As part of the secure link setup process of step 72, the host server 22 proves to the sender that the service name that the sender used to contact the host server 22 is actually associated with that host server 22. For example, the host server 22 may prove that the service name being used by the sender is correct by virtue of the sender and server 22 being in communication over a trusted communications path (e.g., a path that is controlled by a trusted entity).

As another example, host server 22 (as part of the link setup process—e.g., during an SSL or TLS handshaking operation) may transmit a certificate (from a certificate authority 20 of FIG. 1 that is trusted by the sender) to the sender that contains the service name. The sender can compare the (signed) service name information that is contained in the certificate to the service name generated by the rule to determine whether there is a match (i.e., the sender can determine whether the server 22 has an identity that matches the expected identity of the host service). If the sender determines that the server's identity is as expected by the sender, the sender can proceed to receive the requested IBE public parameter information from the server over the secure link at step 74. An advantage of this approach is that the pre-existing certificate authority infrastructure normally used to assist during secure link setup operations may be used to verify the host's identity during the public parameter retrieval process.

Figure 7:
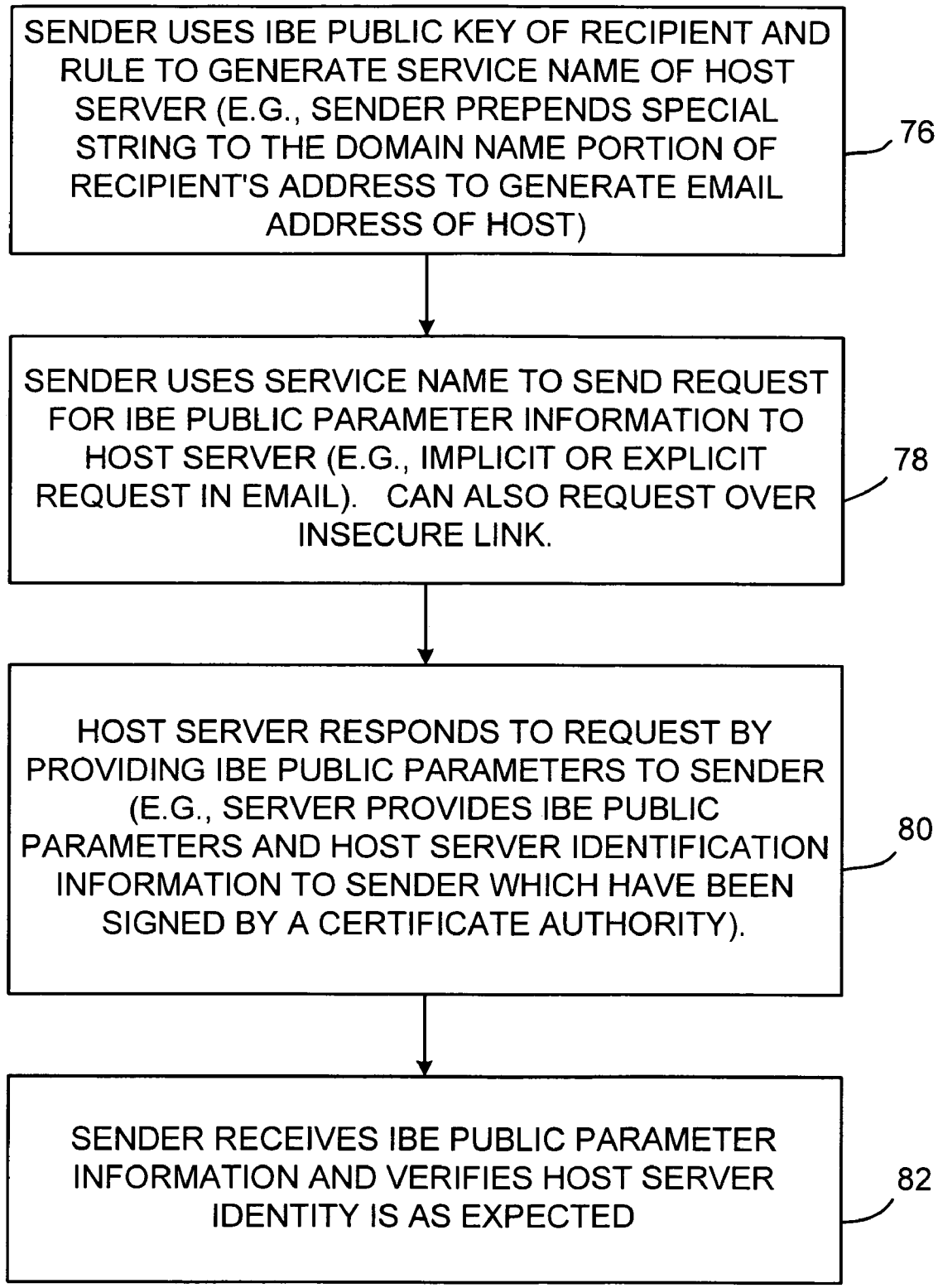
FIG. 7 is a flow chart of illustrative steps involved in using a host server to provide a recipient with IBE public parameter information in a message over an insecure link in accordance with the present invention.

The sender may receive the IBE public parameter information from the host server 22 securely if the IBE public parameter information is encrypted prior to delivery to the sender. This type of approach is illustrated in connection with FIG. 7.

At step 76, the sender may use the IBE public key of the recipient and the service name generation rule to generate the service name of the host server. For example, the sender may prepend a special string (e.g., "ibepublicparameters@") to the domain name portion of a recipient's email address.

At step 78, the sender may use this service name to send a message to server 22 that requests delivery of the IBE public parameter information to the sender. Suitable network infrastructure equipment (e.g., mail servers 18) that the private key generator 16 has provided with the necessary information on the service name of server 22 during set-up may be used to provide the request to the server 22 (e.g., by routing the request message appropriately).

If desired, an insecure communications link may be used to request delivery of the IBE public parameter information at step 78 (e.g., a domain name server 18 may use the service name it is provided with to determine which IP address should be used to communicate the request to the host 22).

The request for the IBE public parameter information that the sender provides to the server 22 at step 78 may be explicit (e.g., text or code in the request message or other request communication may specifically query the server 22 for the IBE public parameter information) or may be implicit (e.g., server 22 may respond to all messages or other communications that are received from users in the system 10 by providing the IBE public parameter information).

At step 80, the host server 22 may respond to the request from the sender by providing the IBE public parameter information to the sender. The server 22 may encrypt the IBE public parameter information and transmit the encrypted version of the IBE public parameter information to the sender in the form of an encrypted message (e.g., for delivery over an insecure path through network 14).

To prove to the sender that the IBE public parameter information that is being provided by the host server 22 is in fact from the host server 22 (and not from an unauthorized attacker), the host server 22 may have the IBE public parameter information signed by certificate authority 20 prior to delivering the IBE public parameter information to the sender. During the signature process, the certificate authority 20 may also sign information on the identity of the host server 22 (e.g., the host's service name), so that when the sender receives and authenticates the signed information, the sender can verify that the IBE public parameter information was provided by the desired IBE public parameter hosting service.

The sender can verify that the IBE public parameter information is correct by comparing the IBE public parameter host server information that has been signed by the trusted certificate authority with information that the sender has on the expected server name (e.g., information on the server's expected identity that the sender has gathered from the domain name portion of the service name or the rule-generated service name itself). If it is determined that the IBE public parameter information was provided by an authorized host server 22, the sender can retain the IBE public parameter information for use in encrypting messages to the recipient.

Figure 8:
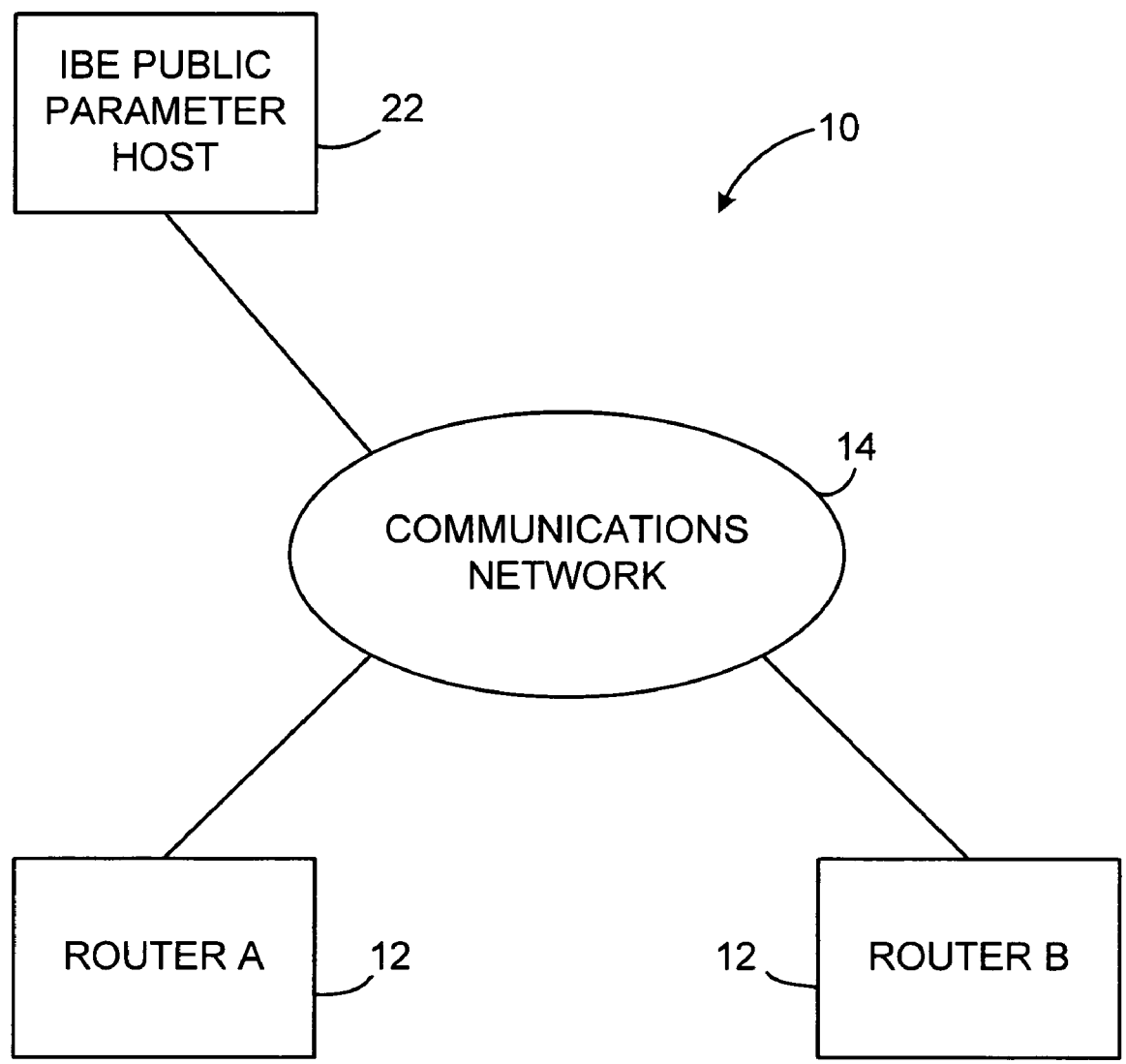
FIG. 8 is a diagram of an illustrative system in which routers send and receive IBE-encrypted messages in accordance with the present invention.

As shown in FIG. 8, the senders and recipients in system 10 may include network-based equipment such as routers A and B. The sender in the example of FIG. 8 (router A) may desire to securely convey routing table update information, a router advertisement, usage statistics, or other network data to the recipient (router B) over network 14. In network 14, routers may be addressed using IP addresses. In this type of environment, an illustrative IBE public key for router B might be Q=171.64.23.25 (where 171 is the first byte of the IP address, 64 is the second byte, etc.). An illustrative service name generation rule may be (1) "determine the size of the network containing router B's IP address and which bytes in the IP address are fixed (for example router B may be on a class B network and the first and second bytes of the IP address may be fixed and the third and forth bytes may be variable), and (2) take all variable IP address bytes (e.g., the third and forth bytes 23 and 25 in this example) and replace them with special known values (e.g., 1 and 1) to construct the IP address of IBE public parameter host 22 (e.g., to construct the service name/IP address of 171.64.1.1 in this example).

Once the service name (IP address of host 22) has been generated by router A, router A can use this IP address to request the IBE public parameter information associated with router B from host 22 over network 14. When the host 22 returns the IBE public parameter information for router B to router A, router A can use the IBE encryption engine at router A to perform IBE encryption on the message. The message may be, for example, an IP packet containing a router advertisement, usage statistics, etc. that is to be sent to router B.

In the example of FIG. 8, the sender and recipient's were routers, but in general, the senders and recipients of IBE-encrypted messages in system 10 may use any suitable equipment platform. Moreover, any suitable communications protocol may be used in network 14 provided that the protocol has a naming scheme for addressing entities in the network. Illustrative communications protocols that may be used in network 14 include email protocols, telephony protocols, http-type protocols (e.g., SSL and TLS), and ftp protocols.

A service name generation rule may be used to locate an IBE public parameter host 22 in an environment in which recipient IBE public keys Q are based solely on policy information (and not a particular individual's identity). For example, a sender in system 10 may be a content distribution service that desires to distribute encrypted movies to people who have subscribed to a particular service. Films may be encrypted using IBE public keys such as Q="film=filmname; studio=studio name; region=region name; release date=xx-yy-zz". The service name generation rule may be "take the region name portion of the IBE public key of the recipient and use it to form a service name by combining the top-level domain that is associated with the region name with a special string to form a domain name." As an example, the region name may be "Germany." The special string may be "ibepublicparameters." and the resulting service name may be "ibepublicparameters.de" (where "de" is the domain name extension for Germany). In this example, each country (region) may have a different associated set of public parameters and its own associated IBE public parameter information host 22 for hosting those IBE public parameters. The use of a geographical region attribute such as the region name attribute from a policy-based IBE public key in creating the service name is merely an example. Any suitable IBE public key attribute may be used in generating the service name if desired.

The configurations shown and described above are merely illustrative. If desired, the functions of the private key generator, hosts, network equipment, and certificate authorities may be combined so that any suitable group of these services or entities may be co-located and/or operated by the same entity (or group of entities). As an example, the same organization may operate the private key generator 16 and host 22, so the private key generation functions of IBE private key generator 16 may be integrated with the functions of the IBE public parameter host server 22. These functions may be co-located. If desired, the functions of the private key generators and other components of FIG. 1 may be subdivided. For example, the functions used in generating private keys and public parameters from a master secret may be split across multiple entities (by subdividing the master secret), so that no one entity alone can generate private keys and public parameters for that master secret. In general, any suitable number of users may be associated with each private key generator and any suitable number of private key generators 16, host servers 22, Internet infrastructure servers 18, certificate authorities 20, and users 12 may be may be included in system 10.

The equipment of FIG. 1 may be based on hardware such as computers or other processor-based equipment. The methods for operating and using this hardware may be implemented by firmware and/or code ("software") that runs on the hardware. The hardware may include fixed and removable computer-readable storage media such as memory, disk drives, etc. on which the software for implementing the features of the system may be stored (permanently and during execution). The software may be used to configure the hardware of the user equipment, certificate authorities, Internet servers, private key generators, host servers, and other portions of the system to perform the functions of the identity-based encryption schemes described in connection with FIGS. 1–7.

The foregoing is merely illustrative of the principles of this invention and various modifications can be made by those skilled in the art without departing from the scope and spirit of the invention.

What is claimed is:

1. A method for using identity-based encryption (IBE) to securely convey messages in a system in which senders communicate with recipients over a communications network, wherein the recipients each have an associated IBE public key and an associated IBE private key for use in IBE encryption and decryption, wherein the system includes a plurality of IBE private key generators each of which generates a plurality of associated IBE private keys for a plurality of associated recipients to use in decrypting messages encrypted with their respective IBE public keys, wherein each IBE private key generator generates different IBE public parameter information to be used in encrypting messages for its associated recipients, wherein the different IBE public parameter information generated by each IBE public key generator is maintained by a different respective IBE public parameter host, and wherein each IBE public parameter host has a different service name that is used to communicate with that host over the network, the method comprising:

at a sender who desires to send an encrypted message to a given recipient who is associated with a given one of the plurality of IBE public parameter information hosts, using a service name generation rule to determine which of the IBE public parameter hosts should be contacted to obtain the IBE public parameter information that is associated with the given recipient and that is to be used in encrypting the message to the given recipient, wherein using the service name generation rule comprises using the service name generation rule to generate the service name of the IBE public parameter information host that is associated with the given recipient based on the IBE public key of the recipient;

using the service name to obtain the IBE public parameter information associated with the given recipient for the sender from the IBE public parameter host that is associated with the given recipient over the network; and at the sender, using the IBE public parameter information obtained from the IBE public parameter host and the IBE public key of the recipient to encrypt a message for the recipient.

2. The method defined in claim 1 further comprising:

at the sender, using the service name generated with the service generation rule and the IBE public key to provide the IBE public parameter host that is associated with the given recipient with a request that the host provide the IBE public parameter information to the sender; and with the IBE public parameter host that is associated with the given recipient, providing the IBE public parameter information to the sender in response to the request for the IBE public parameter information from the sender.

3. The method defined in claim 2 further comprising:

at the sender, sending the request to the host that is associated with the given recipient as an email message.

4. The method defined in claim 1 further comprising electronically conveying the IBE public parameter information maintained at each IBE public parameter host from the IBE private key generator that is associated with that IBE public parameter host to that IBE public parameter host over the network.

5. The method defined in claim 1 wherein the given recipient has a message address, the method further comprising:

at the sender, using the service name generation rule to generate the service name of the IBE public parameter information host associated with the given recipient by prepending a string to at least a portion of the message address.

6. The method defined in claim 1 wherein the given recipient has an email address having a domain name portion, the method further comprising:

at the sender, using the service name generation rule to generate the service name of the IBE public parameter information host associated with the given recipient by prepending a string to the domain name portion of the email address.

7. The method defined in claim 1 wherein each IBE public parameter information host has an identity, the method further comprising:
at the sender, verifying the identity of the IBE public parameter information host from which the IBE public parameter information for the given recipient is obtained.

8. The method defined in claim 7 wherein verifying the identity of the IBE public parameter information host associated with the given recipient comprises:
at the sender, comparing service name information received from the IBE public parameter information host associated with the given recipient by the sender to the service name generated with the service name generation rule to determine whether there is a match.

9. The method defined in claim 7 wherein the IBE public key of the given recipient includes a message address having a domain name portion and wherein verifying the identity of the IBE public parameter information host associated with the given recipient comprises:
at the sender, comparing identity information received from the IBE public parameter information host associated with the given recipient by the sender to the domain name portion of the message address to determine whether the identity information matches the domain name portion.

10. The method defined in claim 7 wherein a certificate authority provides a certificate that contains the service name of the IBE public parameter information host associated with the given recipient and wherein verifying the identity of the IBE public parameter information host associated with the given recipient comprises:
providing the certificate that contains the service name of the IBE public parameter information host associated with the given recipient to the sender so that the sender can compare signed service name information in the certificate to the service name of the host that was generated by the service name generation rule to determine whether there is a match.

11. The method defined in claim 1 further comprising, with the IBE public parameter information host associated with the given recipient, providing the sender with identity information signed by a certificate authority.

12. The method defined in claim 1 further comprising, with the IBE public parameter information host associated with the given recipient, providing the sender with the IBE public parameter information signed by a certificate authority.

13. The method defined in claim 1 wherein providing the IBE public parameter information associated with the given recipient to the sender comprises providing the IBE public parameter information associated with the given recipient to the sender over a secure communications link.

14. The method defined in claim 1 wherein providing the IBE public parameter information associated with the given recipient to the sender comprises providing the IBE public parameter information associated with the given recipient to the sender over an insecure communications link.

15. The method defined in claim 14 wherein providing the IBE public parameter information associated with the given recipient to the sender over the insecure link comprises using the IBE public parameter information host associated with the given recipient to encrypt the IBE public parameter information associated with the given recipient in a message format prior to sending the IBE public parameter information associated with the given recipient to the sender in the message format over the insecure link.

16. The method defined in claim 1 wherein the message is an email message and wherein the IBE public key of the given recipient comprises an email address, the method further comprising:
at the sender, using the email address of the given recipient to send the email message to the given recipient over the communications network.

17. The method defined in claim 1 wherein the message is an instant message and wherein the IBE public key of the given recipient comprises an instant message address, the method further comprising:
at the sender, using the instant message address of the given recipient to send the instant message to the given recipient over the communications network.

18. The method defined in claim 1 further comprising providing the sender with the service name generation rule in a plug-in module.

19. The method defined in claim 1 further comprising providing the sender with the service name generation rule as part of an email program.

20. The method defined in claim 1 wherein the service name comprises a domain name, the method further comprising:
at the sender, using the domain name to establish a secure sockets layer communications link with the IBE public parameter information host associated with the given recipient over the Internet.

21. The method defined in claim 1 wherein the given recipient comprises a router having an associated IP addresses and wherein the host has an associated IP address, the method further comprising:
at the sender, using the service name generation rule to generate the service name from the given recipient's IP address by changing at least one variable byte in the recipient's IP address to create the IP address of the host.

22. The method defined in claim 1 wherein the IBE public key of the given recipient contains at least one geographical region attribute, the method further comprising using the service name generation rule to generate the service name by basing the service name at least partially on the geographical region attribute.

23. The method defined in claim 1 wherein the given recipient has an email address having a domain name portion, the method further comprising:
at the sender, using the service name generation rule to generate the service name of the IBE public parameter information host associated with the given recipient by prepending a string to the domain name portion of the given recipient's email address and using that service name to obtain the IBE public parameter information from the IBE public parameter information host associated with the given recipient over the communications network.

* * * * *